United States Patent
Kirsch (10) Patent No.: US 7,300,486 B1
(45) Date of Patent: Nov. 27, 2007

(54) FILTER ELEMENTS HAVING INJECTION MOLDED THERMOPLASTIC SEALS AND METHODS OF MAKING SAME

(75) Inventor: Mark T. Kirsch, Mount Holly, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 522 days.

(21) Appl. No.: 10/404,109

(22) Filed: Apr. 2, 2003

(51) Int. Cl.
    *B01D 46/00* (2006.01)
(52) U.S. Cl. ............................. 55/502; 55/497; 55/521; 55/528; 55/522
(58) Field of Classification Search ................. 55/502, 55/509, 385.3, 490, 487, 498, 499, 507, 521, 55/DIG. 28, DIG. 30, 497, 528, 522; 525/191
    See application file for complete search history.

(56) References Cited

U.S. PATENT DOCUMENTS

| | | | |
|---|---|---|---|
| 3,397,518 A * | 8/1968 | Rogers | 55/497 |
| 3,659,896 A * | 5/1972 | Smith et al. | 296/93 |
| 3,747,772 A | 7/1973 | Brown | |
| 3,884,662 A | 5/1975 | Hladik | |
| 4,031,283 A | 6/1977 | Fagan | |
| 4,098,942 A | 7/1978 | Tart et al. | |
| 4,612,237 A | 9/1986 | Frankenburg | |
| 5,409,606 A | 4/1995 | Spencer | |
| 5,472,537 A * | 12/1995 | Friel et al. | 156/69 |
| 5,676,778 A | 10/1997 | Marble | |
| 5,679,122 A * | 10/1997 | Moll et al. | 55/497 |
| 5,688,301 A | 11/1997 | Brandon et al. | |
| 5,720,790 A * | 2/1998 | Kometani et al. | 55/497 |
| 5,755,844 A * | 5/1998 | Arai et al. | 55/502 |
| 5,792,229 A * | 8/1998 | Sassa et al. | 55/497 |
| 5,885,390 A | 3/1999 | Alkire et al. | |
| 5,902,361 A | 5/1999 | Pomplun et al. | |
| 5,958,097 A * | 9/1999 | Schlor et al. | 55/497 |
| 5,980,680 A | 11/1999 | Miller | |
| 6,045,600 A * | 4/2000 | Michaelis et al. | 55/502 |
| 6,077,795 A | 6/2000 | Blinkhorn et al. | |
| 6,174,343 B1 | 1/2001 | Bloomer | |
| 6,288,171 B2 * | 9/2001 | Finerman et al. | 525/192 |
| 6,315,805 B1 | 11/2001 | Strauss | |
| 6,375,699 B1 * | 4/2002 | Beck | 55/497 |
| 6,406,509 B1 | 6/2002 | Duffy | |
| 6,454,826 B2 * | 9/2002 | Fath et al. | 55/490 |
| 6,508,851 B2 * | 1/2003 | Goerg | 55/385.3 |
| 6,706,087 B1 * | 3/2004 | Gebler et al. | 55/492 |
| 6,797,028 B2 * | 9/2004 | Duffy | 55/385.2 |

(Continued)

FOREIGN PATENT DOCUMENTS

DE 10111118 11/2001

(Continued)

*Primary Examiner*—Duane Smith
*Assistant Examiner*—Sonji Turner
(74) *Attorney, Agent, or Firm*—Honigman Miller Schwartz & Cohn LLP (57) ABSTRACT

Seals for filter elements having filter packs with seals around the periphery thereof adjacent to one of the faces are produced by injection molding the seal onto the filter pack using a cell-less thermoplastic material. Preferably, the thermoplastic material is comprised of thermoplastic particles embedded in ethylene-propyleneterpolymer (EPDM). The resulting seal has a contact portion which bends rather than compresses upon a lid of a housing containing the filter element closing.

6 Claims, 8 Drawing Sheets

U.S. PATENT DOCUMENTS

| | | | |
|---|---|---|---|
| 6,824,581 B1 * | 11/2004 | Tate et al. | 55/385.3 |
| 6,864,195 B2 * | 3/2005 | Peng | 442/41 |
| 6,890,990 B2 * | 5/2005 | Cai et al. | 525/191 |
| 2002/0137835 A1 * | 9/2002 | Abraham et al. | 524/487 |
| 2004/0194441 A1 * | 10/2004 | Kirsch | 55/497 |
| 2006/0084762 A1 * | 4/2006 | Shaw | 525/191 |
| 2006/0100347 A1 * | 5/2006 | Ouhadi et al. | 524/502 |
| 2006/0100377 A1 * | 5/2006 | Ouhadi | 525/191 |

FOREIGN PATENT DOCUMENTS

| | | |
|---|---|---|
| EP | 1129760 | 9/2001 |
| JP | 10263348 A2 | 10/1998 |

* cited by examiner

FILTER ELEMENTS HAVING INJECTION MOLDED THERMOPLASTIC SEALS AND METHODS OF MAKING SAME

FIELD OF THE INVENTION

The present invention is directed to filter elements having injection molded thermoplastic seals and methods of making such filters. More particularly, the present invention is directed to filter elements having generally planar filter media packs which are usually polygonal, wherein thermoplastic elastomer seals are molded thereon.

BACKGROUND OF THE INVENTION

Filter elements include seals for isolating the clean and dirty sides of the filter element from one another so that a fluid such as a gas or liquid does not bypass filter media comprising the filter element. The current practice if to use a casting process to fix foamed urethane seals to the filter media. Generally, this is done by injecting a two part liquid such as a polyall and isocynate mixture into a mold, which mixture under heat foams create the urethane seals with filter media packs encased in the mold with the liquid seal. The foamed urethane seals are designed to withstand sustained temperatures of about 200° F. and will tolerate up to about 275° F. for brief periods. Sustained temperatures at the 275° F. level can cause the seals to become thermoplastic and degrade by reshaping themselves. This is because the cells of the foamed urethane tend to collapse resulting in the seal becoming a less compressible solid and thus loosing its flexibility. This collapse can reduce the volume of the urethane by 200-300% and thus reduce the effectiveness of initially foamed urethane as a seal. Moreover, urethane seals tend to bond with filter element housings made from NYLON® so that it can become difficult to remove filter elements having foam urethane seals from these housings during periodic maintenance.

SUMMARY OF THE INVENTION

In view of the aforementioned considerations, the present invention is directed to a filter element comprising a pleated filter media having filter face portions and side portions joined thereto by corner portions, and comprising a seal of substantially cell-less thermoplastic material disposed at least on one of the corner portions; the seal having a portion which flexes under a bending moment protruding from the adjacent filter face portion, and the seal having been formed on the corner portion by injection molding.

In a further aspect of the invention, the thermoplastic material is a thermoplastic vulcanizate (TPV) such as thermoplastic particles embedded in ethylene-propylene terpolymer rubber (EPT/EPDM).

In another aspect of the invention, the filter element is a panel air filter element comprising a pleated filter media having a dirty-side face portion and a clean-side face portion joined to one another by end surfaces and side surfaces at corner portions. A substantial cell-less thermoplastic seal is disposed at one of the corner portions and extends obliquely from the plane of the face portion on which the corner portion is formed, as well as protruding laterally with respect to the end surfaces and side faces. The thermoplastic seal is formed at the corner by injection molding the thermoplastic material on and between the pleats of the pleated filter media at corner portions of the filter media.

In accordance with a method of making filter elements according to the present invention, the method is directed to inserting a filter media into an injection molding machine, and thereafter injecting a thermoplastic seal around the periphery of a face of the pleated filter media while the filter media is in the injection molding machine to form the filter element. The filter element is then ejected from the injection molding machine. Additional individual filter media are then sequentially inserted to the injection molding machine after previously formed filter elements have been ejected so as to provide a continuous production of individual filter elements.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
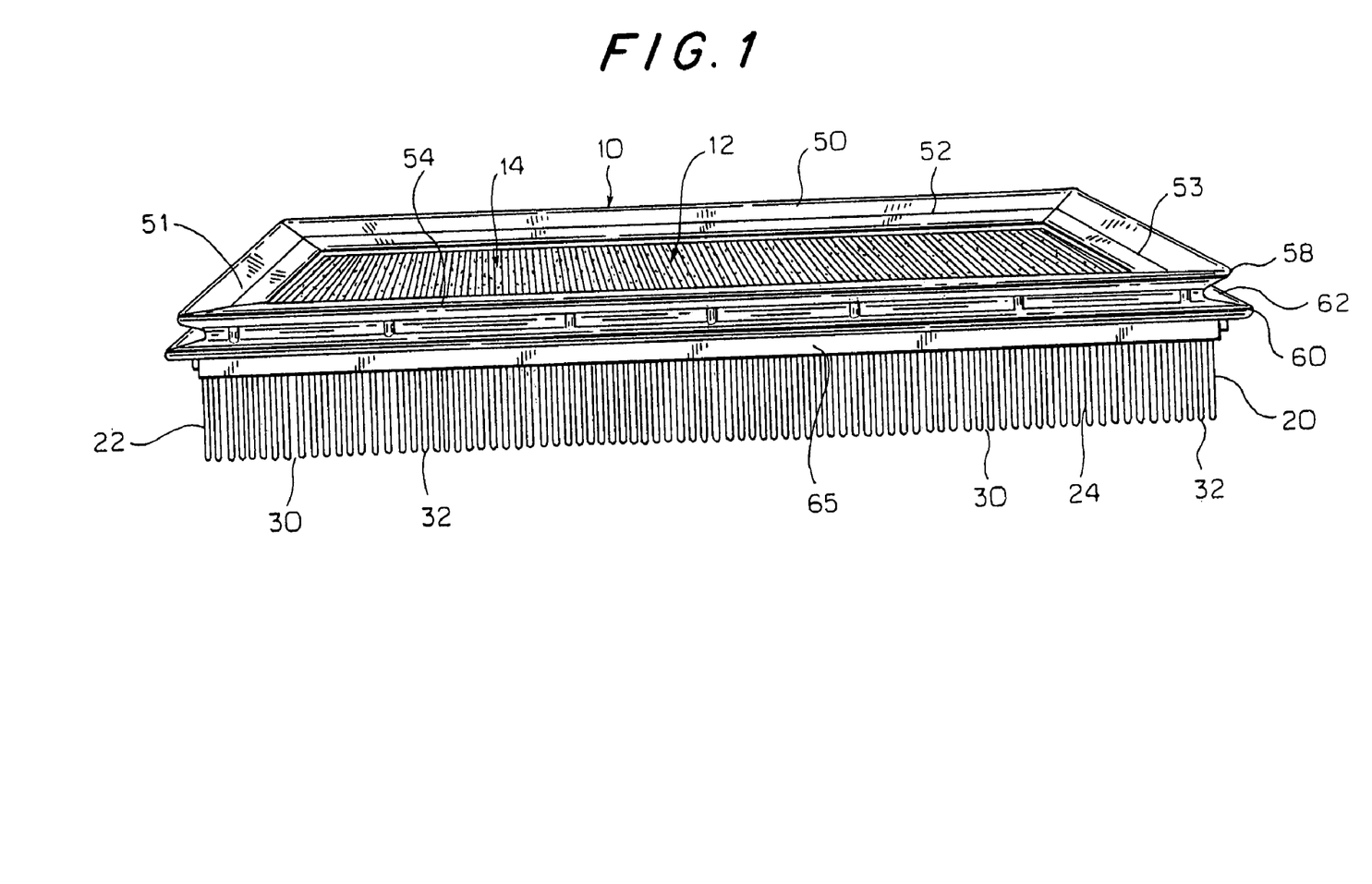
FIG. 1 is a side perspective view of a filter element configured in accordance with the principles of the present invention.
Figure 2:
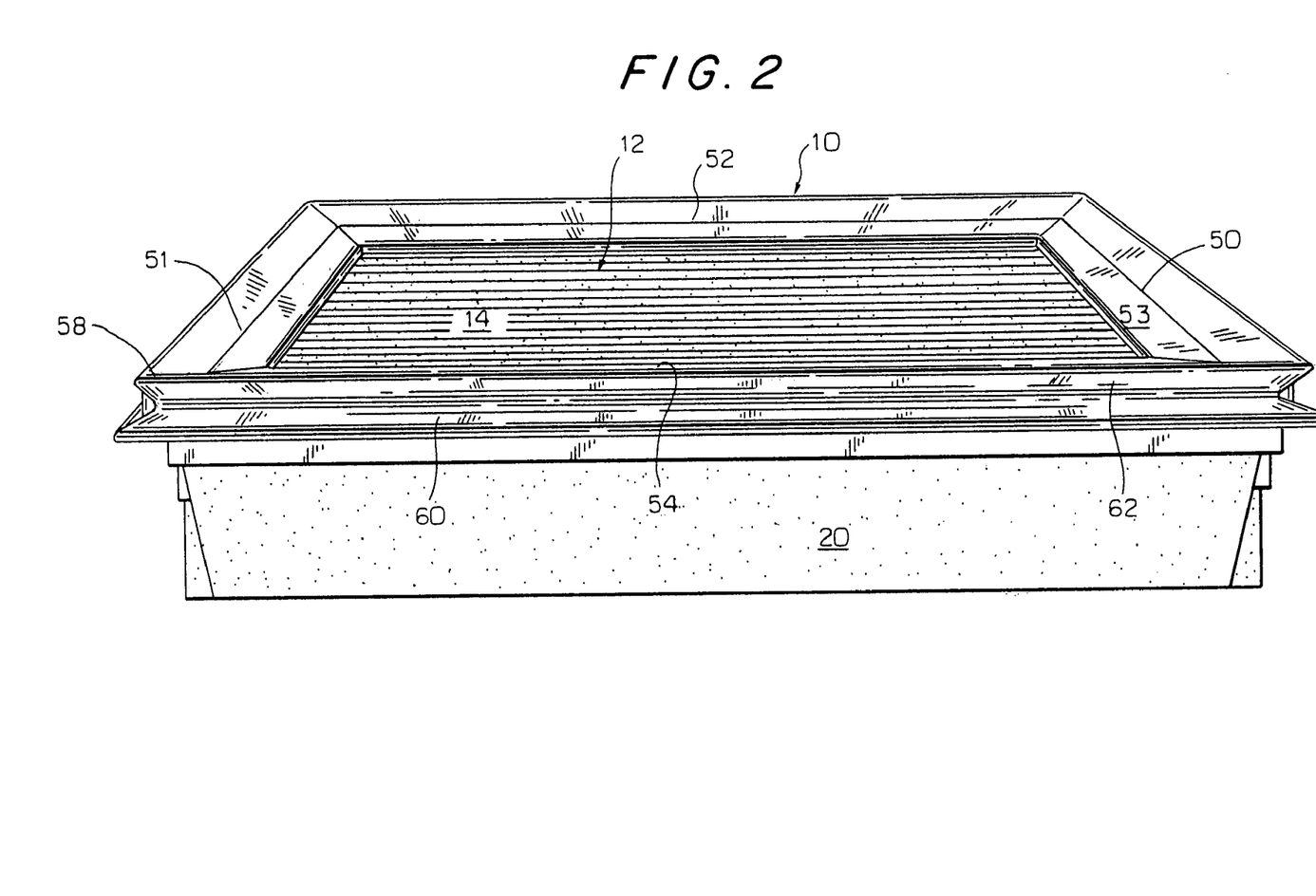
FIG. 2 is an end perspective view of the filter element of FIG. 1.
Figure 3:
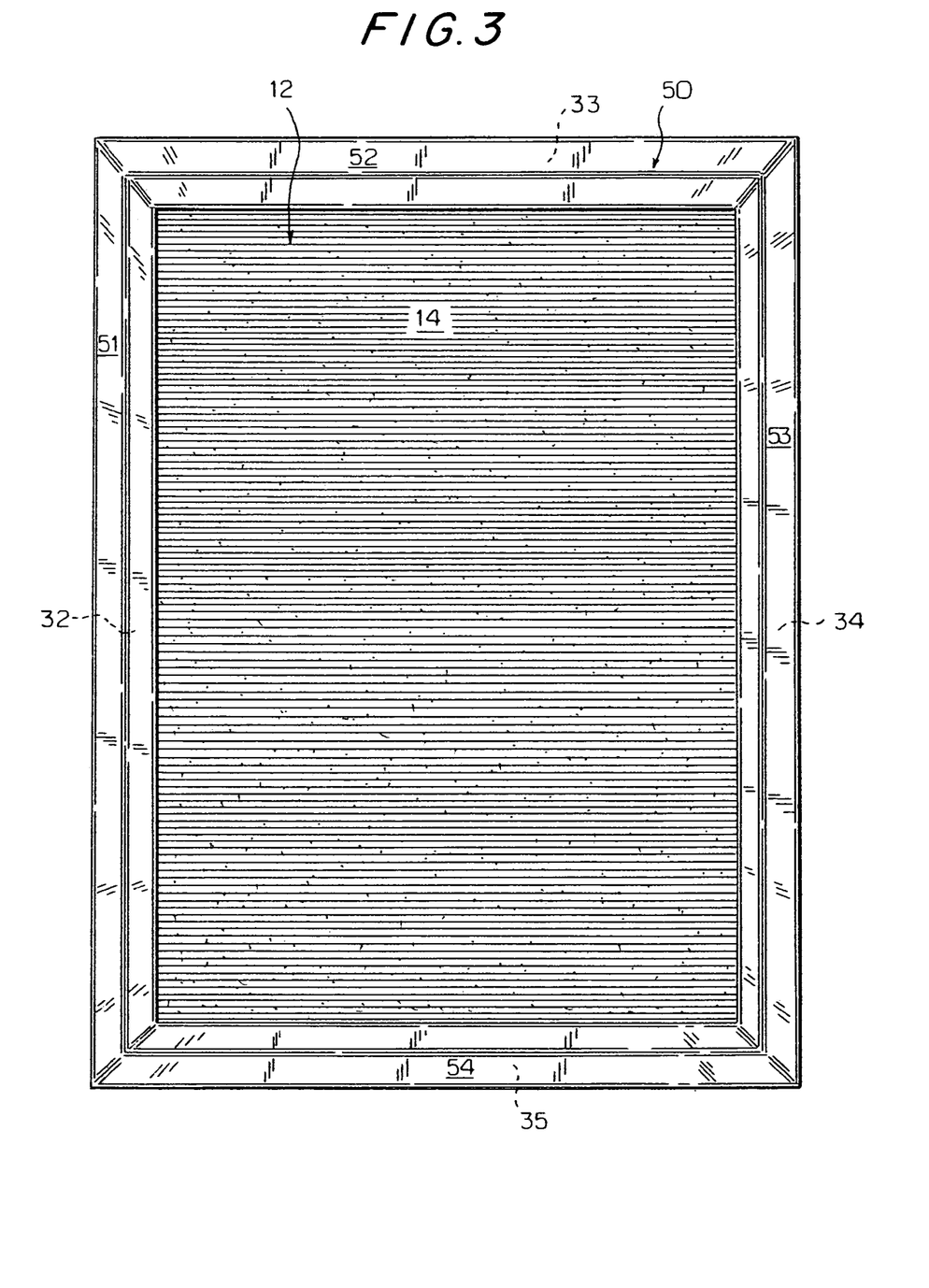
FIG. 3 is a clean-side face view of the filter element of FIGS. 1 and 2.
Figure 4:
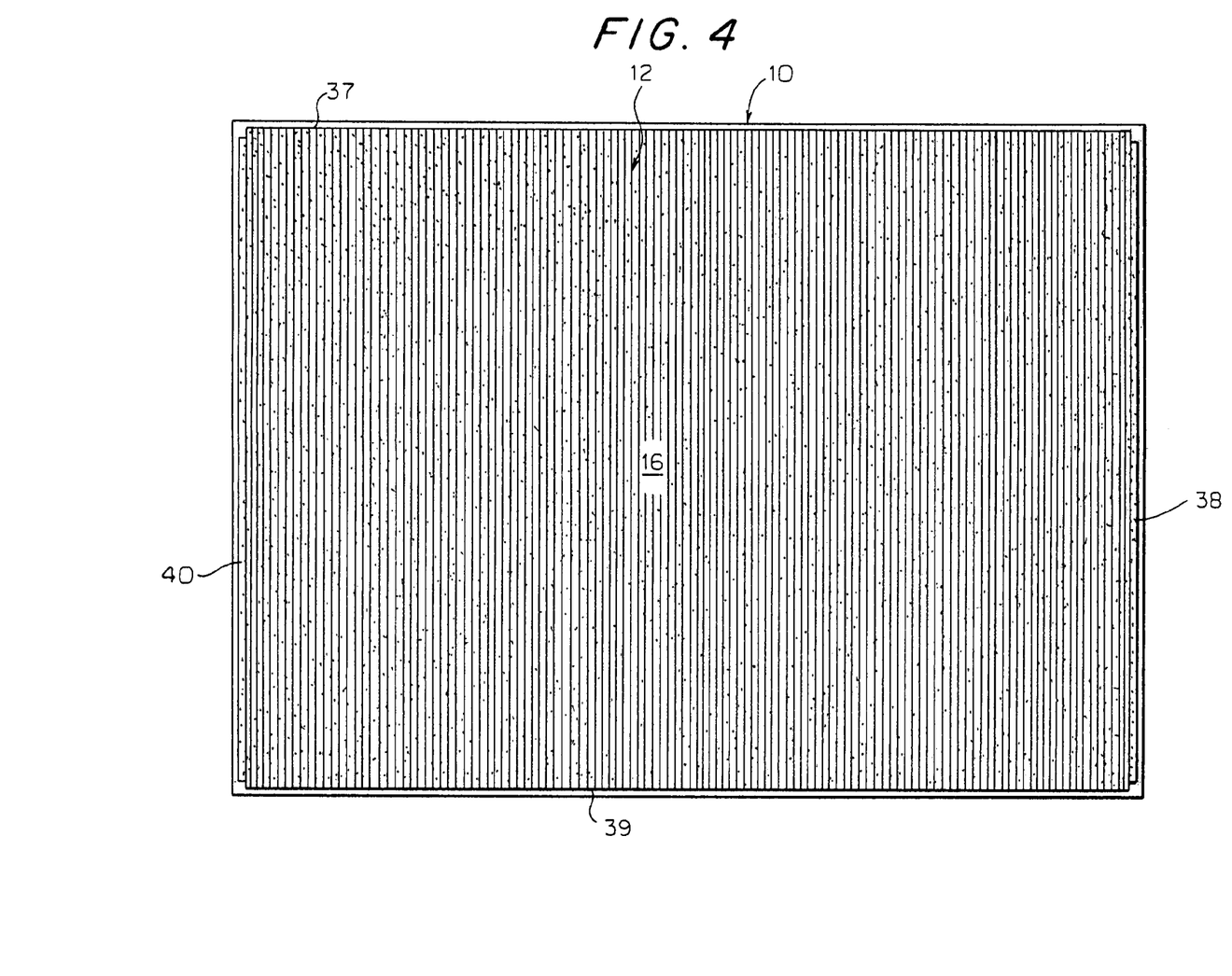
FIG. 4 is a dirty-side face view of the filter element of FIGS. 1-3.

Referring now to FIGS. 1-4, there is shown a filter element 10 configured in accordance with the principles of the present invention wherein the filter element has a pleated paper filter media 12 with a clean side face 14 (FIG. 3) and a dirty side face 16 (FIG. 4). The filter media 12 also includes first and second end surfaces 20 and 22 (FIG. 1) and first and second side surfaces 24 and 26 (FIG. 2). The end surfaces 20 and 22 are flat portions of a continuous web 28 of filter media comprising the filter media 12. The side surfaces 24 and 26 extend normal to gaps 30 between adjacent pleats 32 of the filter media.

The end surfaces 20 and 22 and the side surfaces 24 and 26 of the filter media 12 join the clean side face 14 at corner portions 32, 33, 34 and 35, while the dirty side face 16 joins the end surfaces and sides at corner portions 37, 38, 39 and 40.

It is necessary to isolate the clean side face 14 of the filter element 10 from the dirty side face 16 in order to cause all of the fluid passing through the filter element to be filtered by the filter media 12. This is accomplished by a peripheral seal 50 which is disposed through and on the clean side corner portions 32-35.

In the illustrated embodiment, seal 50 has four sections 52, 53, 54 and 55 which have the same cross sectional configuration. Each of the four sections 52-55 has flexible resilient flanges of solid rather than foamed material that extend both laterally and outwardly with respect to the plane defined by the clean side face 14 of the filter media 12.

Figure 5:
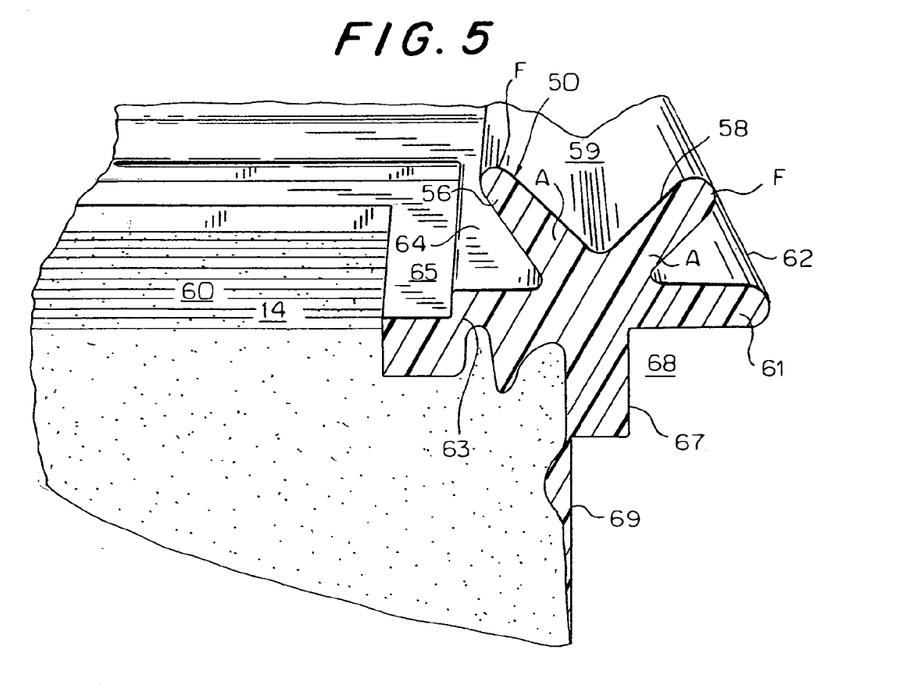
FIG. 5 is an end elevation of a portion of the filter element showing a seal configured in accordance with the present invention.

As is seen in FIG. 5, a first flexible flange 56 is separated by from a second flexible flange 58 by a gap 59. The first flexible flange 56 extends obliquely and laterally inwardly with respect to a plane 60 defined by the clean side face 14, while the second flexible flange 58 extends obliquely and laterally outwardly with respect to the plane 60. When the flexible flange 56 and 58 are pressed against a surface of a housing the flanges bend away from one another widening the gap 59 with the flange 58 bending.

The second flexible flange 58 is separated by from a third flexible flange 61 by a gap 62 while the first flexible flange 56 is separated from a fourth flange 63 by a triangular gap 64. Injection molded material 65 from the fourth flange 63 extends across the clean face 14 of the filter media 14 and into the gaps 32 between the pleats 30. The third flange 61 is separated from a rim 67 of the seal 50 by a notch 68 with a portion 69 of the rim extending into the gaps 32 between the pleats 30.

The fourth flange 63, injection molded material 65, rim 67 and portion 69 of the rim form a base portion B of the seal 50 which is integral with filter media 12 after injection mold. The flexible resilient flanges 56 and 58 provide contact portions C of the seal which have anchor portions A which are unitary with the base portion B and free ends F which are engagable by the lid of the housing. As the lid closes, the flexible resilient flanges 56 and 58 bend with compression against the lid being provided by the bending moment in the flanges.

Figure 6:
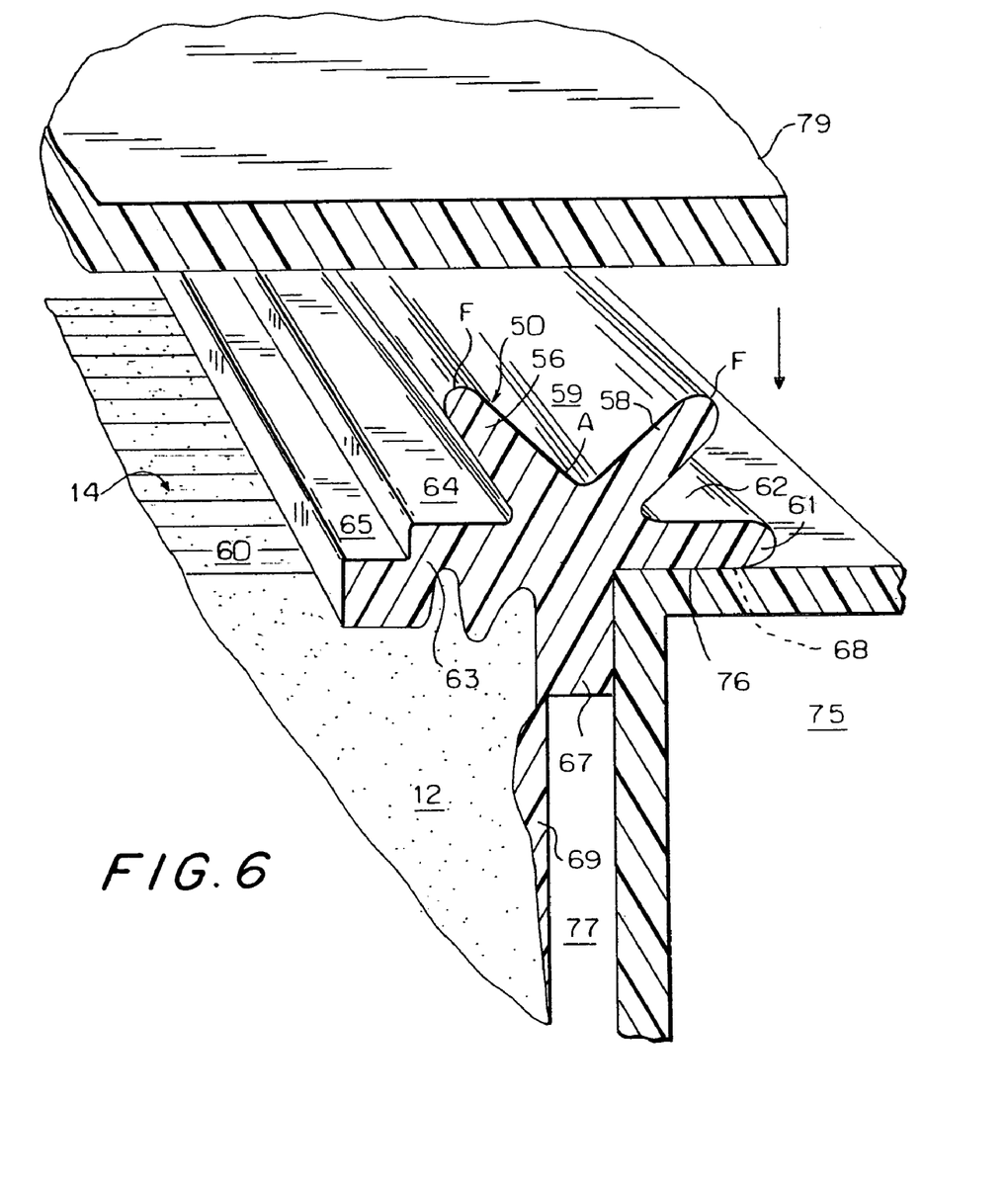
FIG. 6 is a view of the portion of the filter element of FIG. 5 showing that portion mounted in a housing with the lid of the housing open.

Referring now to FIG. 6 where the portion of the filter element of FIG. 5 is shown mounted in a housing 75, it is seen that a ledge 76 of the housing projects into the notch 68 of the seal 58 so that the third flange 61 of the filter element 50 rests on the ledge 76 of the housing 75 with the filter media 12 extending into the opening 77 through the housing.

Figure 7:
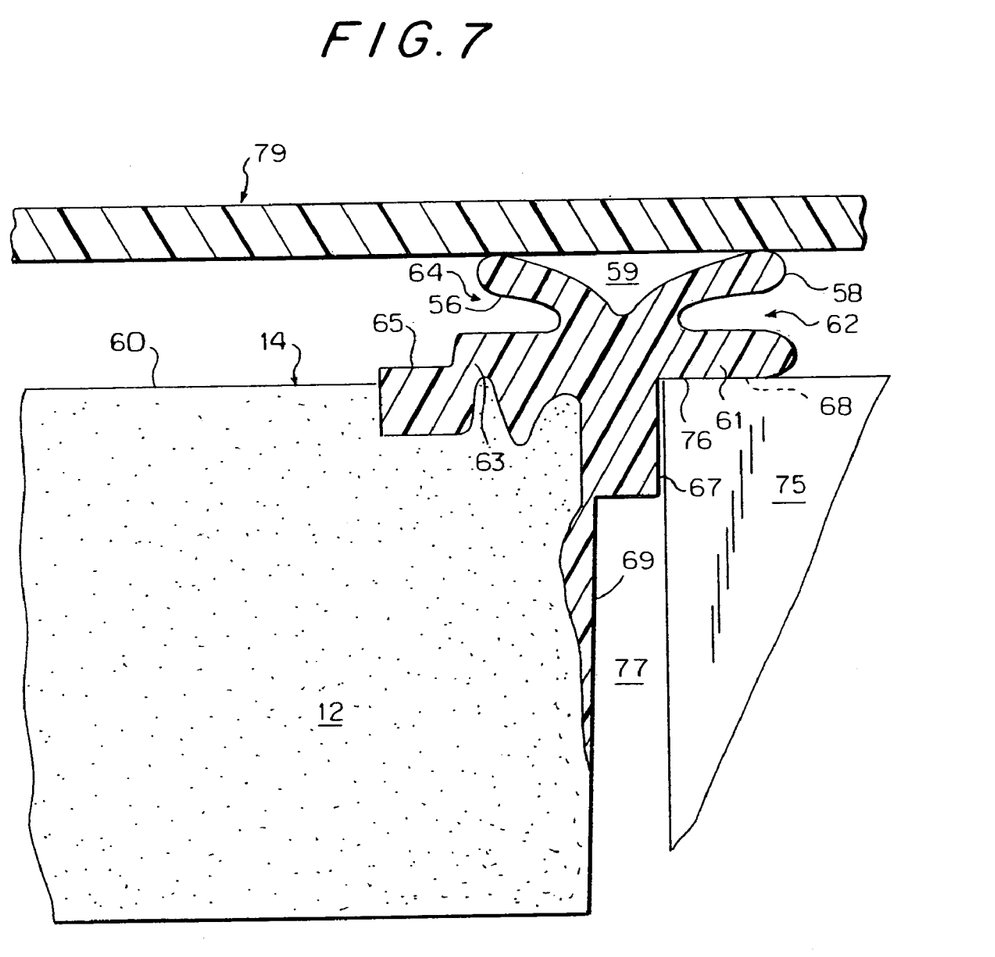
FIG. 7 is a view similar to FIG. 6 but showing the lid of the housing closed.

Referring now to FIG. 7, where the lid 79 of the housing closes, the first and second flexible flanges 56 and 58 bend toward the fourth flange 63 and the third flange 61, respectively, widening the triangular gap 59 and narrowing the triangular gaps 62 and 64. The pressure of the lid 79 against the first and second flanges 56 and 58 urges the third flange 61 against the ledge 76 of the housing, further sealing the clean side 14 of the filter element 10 from the dirty side 16.

The seal 50 is solid without the cells of prior art seals, so that the first and second flanges 56 and 58 provide contact portions of the seal which bend and assert compression against the lid 79 due to bending moments because force from the lid is applied to the free ends F of the first and second flanges. While two flanges are shown, a seal could also be accomplished with a single flange or with another configuration of contact portions the seal which rely on bending rather than compression of the seal material itself. Examples of other configurations for contact portions are circular, oval or polygonal contact portions.

Figure 5A:
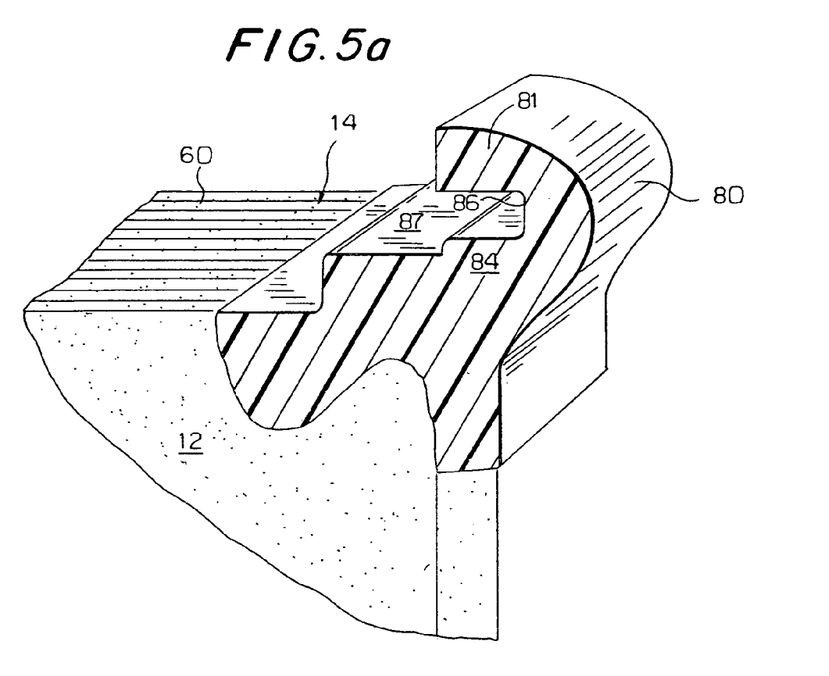
FIG. 5a is an end elevation of an alternative embodiment of a seal configured in accordance with the present invention.

FIG. 5a shows a U-shaped contact portion 80 having a first leg 81 unitary with a base portion 82 of a seal 50' and a second leg 84 connected by a bight 86 to the first leg. Upon engaging the second leg 84 with the lid 79 of the housing 75, the bight 86 bends as the second leg 84 moves toward the first leg 81 into the void 87 therebetween.

In accordance with the present invention, the seal 50 is preferably comprised of a thermoplastic vulcanizate (TPV) such as thermoplastic vulcanizate particles embedded in ethylene-propylene terpolymer rubber (EPT/EPDM). While this type of material is preferred, other elastic and resilient thermoplastic materials which are capable of being injection molded on and into the corners, 32, 33, 34 and 35 at the periphery of the filer media pack 12 may be used.

Figure 8:
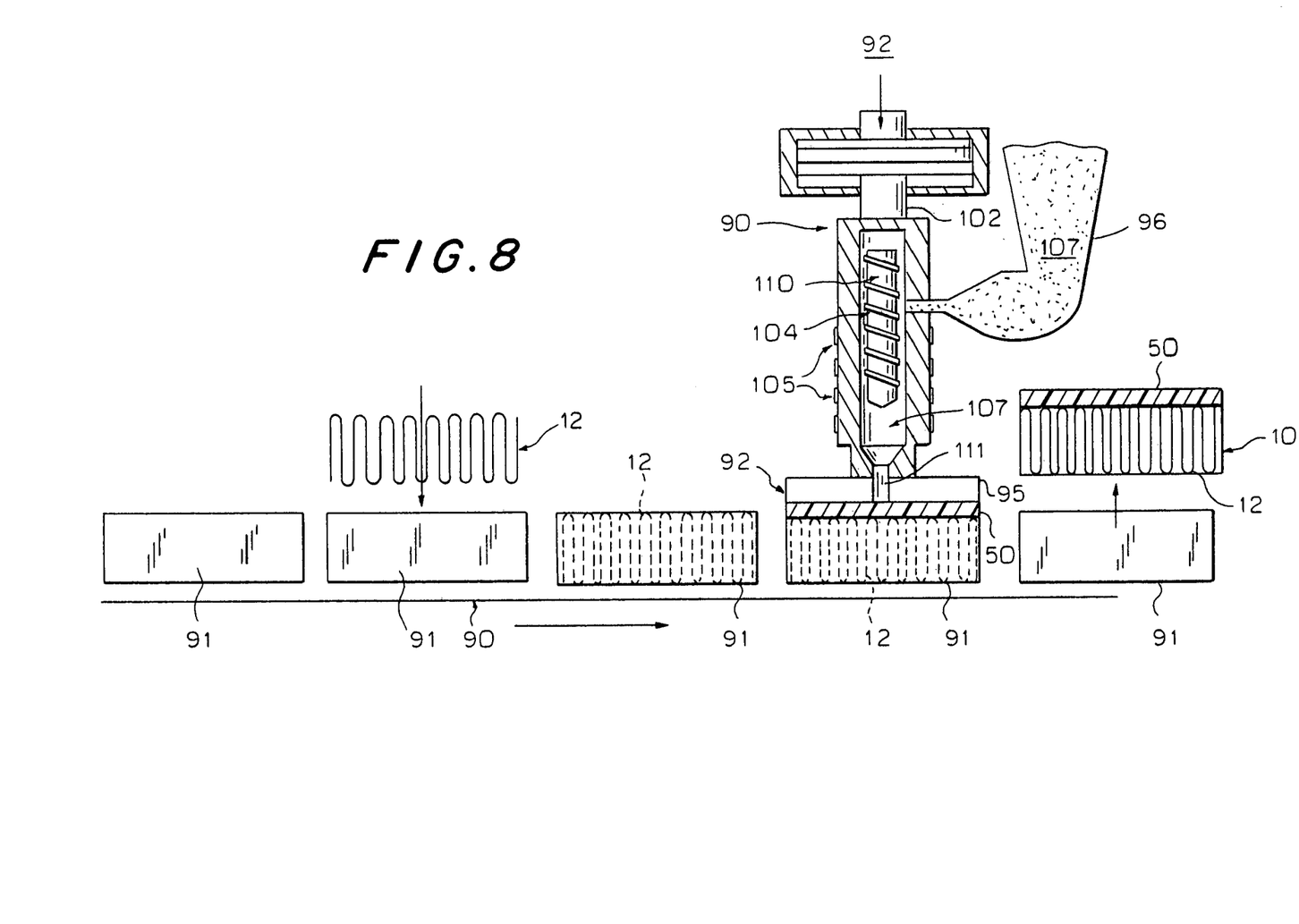
FIG. 8 is a schematic side view showing a method of making filter elements in accordance with the principles of the present invention.

Referring now to FIG. 8, there is shown apparatus for making the filter element 10 shown in FIGS. 1-4 according to a method of the present invention, wherein a production run for numerous filter elements 10 is illustrated. Apparatus for practicing the method of the invention includes a conveyer 90 on which is mounted the bottom section 91 of a two-section mold 92. The pleated filter media 12 is inserted into the bottom mold section 91 prior to, or in conjunction with, mounting a seal mold section 95 on the bottom mold section 91. In another arrangement, the seal mold section 95 may be integral with injection molding machine 100 (as shown) and the bottom mold section 91 may simply be advanced into alignment with the seal mold section 95 with the mold 92 being shut at an injection molding station 102.

In the injection molding machine 100, a barrel 104 is heated by heaters 105 while solid thermoplastic pellets are fed into the barrel 104 from a hopper 106. The thermosetting material 107 of the pellets is carried by a screw 110 within the barrel 104 down to a nozzle portion 111 of the barrel for injection into the seal mold section 95, which shapes the seal 50 as a ram 102 injects the molten material 107 into the seal mold section 95. It takes approximately thirty seconds for the seal 50 to cool and solidify. The mold 92 is then opened by separating the seal mold section 95 from the bottom mold section 91 and the finished filter element 10, comprised of the filter media 12 and seal 50, is ejected from the bottom mold section 91.

A subsequent bottom mold 91 carrying another filter media pack 12 is then aligned and closed by the second section 95. Approximately thirty seconds later, a second complete filter element 10 comprised of a filter media 12 and seal 50 is ejected.

While a rectangular panel filter element is disclosed as produced and configured in accordance with the principles of the present invention, the filter element may have other than a rectangular or square shape. For example, the filter element many be circular, triangular, or be polygonal with more than four sides, such as generally rectangular filter element with having an additional short side. The filter element may also be annular with the seals being disposed at one or both end faces by utilizing thermal setting materials which have been injection molded onto the annular filter media. While pleated cellulose or cellulose blend filter media is disclosed in the embodiment of this application, other types of filter media which have woven or non-woven polymer strand filter media (such as polyester or polypropylene strands) or foam-type filter media may utilize injection molded thermoplastic seals as set forth in this invention.

From the foregoing description, one skilled in the art can easily ascertain the essential characteristics of this invention, and without departing from the spirit and scope thereof, can make various changes and modifications of the invention to adapt it to various usages and conditions.

I claim:

1. A filter element to be disposed in a filter housing, wherein the filter housing includes an inner surface, a ledge, and a lid, comprising:
   a filter media including a first material, wherein the filter media includes a clean side face; and
   a seal including a second material bonded to the clean side face, wherein the seal is bonded to a perimeter of the clean side face to form a flange portion integral with the filter element, wherein the second material includes thermoplastic vulcanized particles (TPV) embedded in ethylene-propylene terpolymer rubber (EPT/EPDM).

2. The filter element according to claim 1 further comprising a rim portion, wherein the rim portion is bonded to a perimeter of the filter media, wherein the perimeter of the filter media includes at least one side surface of the filter media, wherein the rim portion is adapted to radially engage and seal said inner surface of said filter housing.

3. The filter element according to claim 2, wherein the seal includes a second flange portion integrally-extending from the flange portion in a perpendicular direction with respect to the at least one side surface of the filter media, wherein the second flange portion is adapted to overlay and seal said ledge of said filter housing.

4. The filter element according to claim 1 further comprising a flexible portion extending from the flange portion that is adapted to be compressed by said lid of said filter housing.

5. The filter element according to claim 4, wherein the flexible portion includes a pair of flexible flange portions that extend obliquely in divergent directions from the flange portion.

6. The filter element according to claim 1, wherein the first material is a pleated filter media including cellulose, cellulose blends, polyester fibers, or polypropylene fibers.

* * * * *